United States Patent [19]

Guerriero et al.

[11] Patent Number: 4,547,346

[45] Date of Patent: Oct. 15, 1985

[54] PROCESS FOR THE SEPARATION OF ARSENIC FROM ACID SOLUTIONS CONTAINING IT

[75] Inventors: Renato Guerriero, Mestre; Giuseppe Veronese, Padova; Agostino Baradel; Luigi Rivola, both of S.Donato Milanese, all of Italy

[73] Assignee: SAMIM Societa Azionaria Minero-Metallurgica S.p.A., Rome, Italy

[21] Appl. No.: 627,565

[22] Filed: Jul. 3, 1984

[30] Foreign Application Priority Data

Jul. 7, 1983 [IT] Italy ................................ 21977 A/83

[51] Int. Cl.$^4$ .............................................. C01B 27/00
[52] U.S. Cl. ........................................ 423/87; 423/24; 423/139
[58] Field of Search .......................... 423/87, 24, 139

[56] References Cited

U.S. PATENT DOCUMENTS 4,102,976  7/1978  Hiemeleers et al. ................. 423/87

FOREIGN PATENT DOCUMENTS

| 114830 | 9/1981 | Japan | 423/87 |
| 38324 | 3/1982 | Japan | 423/87 |
| 569259 | 9/1978 | U.S.S.R. | 423/87 |

*Primary Examiner*—John Doll
*Assistant Examiner*—Wayne A. Langel
*Attorney, Agent, or Firm*—Birch, Stewart, Kolasch & Birch

[57] ABSTRACT

Process for the separation of arsenic from acid aqueous solutions containing arsenic and other metals characterized in that the acid aqueous solution is placed in the contact with water-immiscible organic solvent which extracts the arsenic, the arsenic being reextracted from the organic solvent by means of a countersolvent.

10 Claims, No Drawings

PROCESS FOR THE SEPARATION OF ARSENIC FROM ACID SOLUTIONS CONTAINING IT

The present invention relates to a process for the separation of arsenic from acid solutions which contain it.

More particularly the present invention relates to a process for the separation of arsenic from sulphuric acid solutions of copper and other ions.

Nearly all the commercial copper is produced by means of the electrolytic refining of a raw material consisting of about 99.5% of copper and containing arsenic, together with many other foreign elements. Such raw material (blister), suitably remelted and poured in the form of sheets, forms the anode of an electrolytic cell, whose cathode can be a sheet of copper or, in the more modern plants, stainless steel or titanium.

The electrolyte is a solution of copper sulphate, containing a large amount of free sulphuric acid.

The flowing of the electrical current causes the copper to be dissolved at the anode, at the same time the copper being deposited at the cathode. Among the impurities contained by the anode, some of them remain undissolved and form the so-called "anode sludge", others (less noble elements than copper) are electrochemically dissolved. One of the latter is arsenic, whose concentration therefore increases constantly. The need arises for consequently removing it, for the purpose of avoiding the contamination of the product.

Other metallurgical problems then exist, in which the control of the arsenic, and its removal are very important.

Such problem exists in the case of the recovery of the copper by a sulphuric acid electrolytic process with insolable anodes, from residuals such as e.g. the copper-containing foams originating from the purifying stages in the primary lead metallurgy.

The input-output equilibrium of the arsenic (and other impurities) must therefore be controlled, and a technique from the prior art provides for the periodical diverting out of the cycle of a share of the copper-containing electrolyte on which multi-stage electrolytic separations are effected, in which the As is eliminated as a As-Cu alloy.

However, the electrolysis of solutions at a low content of copper and high content of arsenic presents the danger of the appearance of arsine, an extremely toxic gas, and requires therefore particular procedures and precautions.

The subsequent recycle of the alloy moreover presents problems of a technical and economic character.

It is therefore of particular interest to have available a simpler process for the selective removal of arsenic from the copper-containing electrolyte or in any event from strongly acid solutions.

Method are already known consisting of the extraction of arsenic from a copper-containing electrolyte by means of suitable organic solutions, containing as their main active component tributylphosphate. From such solutions the arsenic can be reextracted by means of water or acid or alkaline acqueous solutions, and separated by precipitating it as a sulphide, using hydrogen sulphide or alkali sulphides, or as arsenic trioxide, using sulphur dioxide or sulphites.

As an example, in the German Patent Application No. 2603874 the separation of the arsenic from the copper is substantially claimed, in solutions acidified by means of sulphuric acid, by extracting it by means of hydrocarbon solutions containing from 50 to 75% of tributylphosphate and in addition 5% or less of a high-boiling alcohol whose function is expressly described as one of inhibiting the formation of a third phase upon the increase of the arsenic concentration in the organic phase.

In the German Patent Application No. 2615638 the use is claimed of a trialkyl, triaryl or triarylalchyl phosphate, preferably tributylphosphate, diluted in a hydrocarbon and containing minor quantities of isodecanol, as an emulsion inhibitor.

In the U.K. Pat. No. 1551023 the use is claimed of a solution in a hydrocarbon containing from 40 to 75% of tributylphosphate and up to 15% of a quaternary ammonium salt, preferably methyltricaprylammonium chloride (Aliquat 336) or of a mixture of methyltri($C_8$-$C_{10}$)alkylammonium chlorides (Adogen 464).

In all the three cases mentioned the use must be noticed of substantial quantities of tributylphosphate, a highly toxic product, and in the third case, a further increase is to be noted of the toxicity of the extraction organic mixture, due to the addition of a quaternary ammonium salt.

It has been surprisingly found that it is possible to separate the arsenic from the copper-containing electrolyte or in general from acid solutions containing other metallic ions by a simple and cheap way, at a high level efficiency, avoiding the previously mentioned toxic products, simply by resorting to the extraction of the arsenic by means of an organic water-immiscible solvent.

The process according to the present invention comprises the stages of placing the copper-containing electrolyte containing arsenic or in general the acid aqueous solution containing ions of arsenic and other metals, in the contact, either in a counter-current or in a con-current arrangement, with an organic water-immiscible solvent, consisting essentially of one or more alcohols, with a number of carbon atoms of at least 5, and preferably in the range from 6 to 13, such organic solvent extracting the arsenic, and of to re-extract the arsenic from the organic solvent by means of a counter-solvent.

Among the organic solvents which can be used in the process according to the present invention, can be mentioned, as non-limitative examples, i-pentanol, n-hexanol, 2-ethyl-1-hexanol, isodecanol, n-dodecanol, i-dodecanol or mixtures thereof. The 2-ethyl-1-hexanol is to be considered as being preferable.

Even if it can lead to a less favourable distribution of the arsenic between the aqueous and the organic phases, diluting the alcohol or the mixture of alcohols, with aliphatic, aromatic, naphthalenic hydrocarbons and mixtures thereof, can be of advantage in some cases, for the purpose of reducing the density and/or the viscosity of the organic phase.

The ratio of the organic solvent to the aqueous phase can vary between 0.1 and 10, and preferably between 1 and 6.

The re-extraction of the arsenic from the organic phase can be effected without any difficulties by using a counter-solvent consisting of alkaline solutions, e.g. 1 N NaOH, neutral solutions, or salty acid solutions, such as, e.g., a 0.1M $H_2SO_4$. Preferably a neutral or slightly acid aqueous solution of sodium sulphate is used.

The following Examples are illustrative of the main features of the invention, but in no way should they have to be considered to limit the scope of the invention.

EXAMPLE 1

In a cylindric separator funnel of 250 ml, 45 ml are introduced of an aqueous solution containing 200 g/l of sulphuric acid, 45 g/l of copper and 5.90 g/l of arsenic. 135 ml are added of 2-ethyl-hexanol, and the whole is strongly shaked for a 5' time. After settling the phases are separated, 5 ml of the water phase are drawn for the analysis and are added to the residual 120 ml of 2-ethyl-hexanol.

The extraction is repeated and the process described is repeated six times, always keeping equal to 3 the ratio of the organic phase to the water phase.

The result obtained are shown in the Table:

| Extraction stage (N°) | Extracted Arsenic (%) |
|---|---|
| 1 | 38.1 |
| 2 | 62.7 |
| 3 | 78.6 |
| 4 | 86.8 |
| 5 | 91.5 |
| 6 | 93.5 |

EXAMPLE 2

Using a sulphuric solution having the same composition as shown in the Example 1 and adopting a ratio of 3 between the organic phase and the aqueous phase, 5 extractions were effected using 2-ethyl-1-hexanol diluted with variable amounts of Escaid 100 (solvent mixture by Exxon consisting of 60% of aliphatic hydrocarbons, of 20% of naphtenic hydrocarbons, and of 20% of aromatic hydrocarbons).

The results are shown in the Table:

| Alcohol in the organic phase (%) | Extracted Arsenic (%) |
|---|---|
| 100 | 40.5 |
| 90 | 39.0 |
| 70 | 37.4 |
| 50 | 32.3 |
| 30 | 24.3 |

EXAMPLE 3

Using a sulphuric solution having the same composition as those shown in the above Examples, and adopting a ratio of 3 of the organic phase to the aqueous phase, extractions were effected using different alcohols. The results are shown in the Table:

| Alcohol | Extracted Arsenic (%) |
|---|---|
| n-Octanol | 29.8 |
| 2-ethyl-1-hexanol | 40.5 |
| isooctanol(*) | 31.0 |
| isononanol(*) | 29.7 |
| LIAL 123(**) | 31.6 |

NOTES:
(*)Technical grade (Exxon)
(**)Mixture of linear n-paraffinic alcohols consisting of about 60% of chains comprising 12 and 13 carbon atoms (Chimica Augusta).

EXAMPLE 4

In a cylindrical separator funnel of 100 ml, 40 ml are introduced of a solution containing 1.4 g/l of arsenic in 2-ethyl-1-hexanol. 40 ml of distilled water are added, and the whole is strongly shaked for a 5' time. After settling, the aqueous phase is separated, and is substituted with a further 40 ml of distilled water, and the extraction process is repeated.

The process is repeated a third time. The results are shown in the Table:

| Extraction stage (N°) | Re-extracted Arsenic (%) |
|---|---|
| 1 | 99.2 |
| 2 | 99.9 |
| 3 | 100.0 |

EXAMPLE 5

In a cylindrical differential contacting vessel of the horizontal type, suitable for effecting continuous liquid-liquid extractions with a total flow rate of the liquids up to 30 l/h, a solution containing:

| Cu | 39.1 g/l |
| Ni | 6.9 g/l |
| As | 5.72 g/l |
| $H_2SO_4$ | 200 g/l | in water has been counter-currently treated for consecutive 30 hours with 2-ethyl-1-hexanol in the volume ratio 1:5. The organic phase has been successively re-extracted in a contacting vessel of the type described, using a water solution at pH 2 by sulphuric acid, and with a volume ratio of 4:1.

The following results have been obtained:

| Extraction: | As in the aqueous phase | 1.12 g/l |
| | As in the organic phase | 0.92 g/l. |
| | Extracted As | 80.4% |
| | Ni and Cu absent from the organic phase | |
| Re-extractions: | As in the organic phase | 0.098 g/l |
| | As in the aqueous phase | 3.58 g/l |
| | Re-extracted As | 97.0% |

We claim:

1. A process for the separation of arsenic from acid aqueous solutions containing arsenic and other metals which comprises treating the acid aqueous solution containing arsenic with a water-immiscible organic solvent consisting essentially of at least one alcohol having 5 to 13 carbon atoms, the ratio of the organic solvent to the aqueous solution being 0.1 to 10.

2. The process as claimed in claim 1, wherein the contact between the acid aqueous solution and the water-immiscible organic solvent is effected in a counter-current flow arrangement.

3. The process as claimed in 1, wherein the contact between the acid aqueous solution and the water-immiscible organic solvent is effected in a con-current flow arrangement.

4. The process as claimed in claim 1 wherein the alcohols are selected from the group consisting of ipentanol, 2-ethyl-1-hexanol, isodecanol, n-decanol, idodecanol, and mixtures thereof.

5. The process as claimed in claim 1, wherein the water-immiscible organic solvent is diluted with a hydrocarbon selected from the group consisting of aliphatic, aromatic and naphthalenic hydrocarbons, or mixtures thereof; said hydrocarbons reducing the density and viscosity of the organic phase.

6. The process as claimed in claim 1, wherein the ratio of the organic solvent to the aqueous solution is within the range from 1 to 6.

7. The process of claim 1 wherein the water-immiscible organic solvent containing arsenic is re-extracted with a member selected from the group consisting of an alkaline solution, a neutral solution, water, salty solutions and an acid solution.

8. The process as claimed in claim 7 wherein the acid solution is a 0,5M solution of $H_2SO_4$.

9. The process as claimed in claim 7, in which the acid solution is a weak acid solution of sodium sulphate.

10. The process as claimed in claim 7, wherein the alkaline solution is a 1N solution of NaOH.

* * * * *